May 8, 1945.   J. O. BISHOP ET AL   2,375,341
BRINELL HARDNESS TESTING DEVICE
Filed Nov. 24, 1942   3 Sheets-Sheet 3
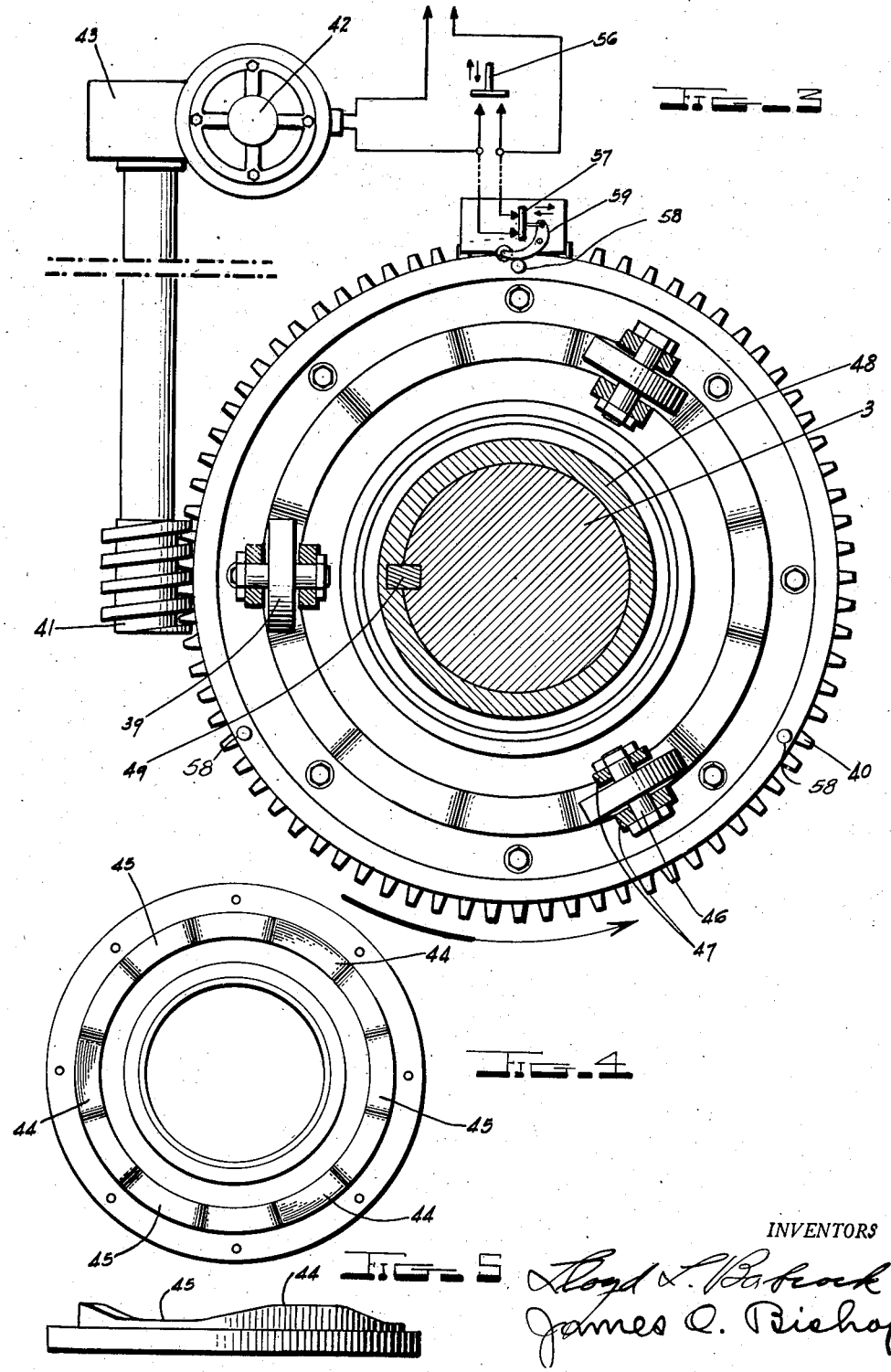
INVENTORS Patented May 8, 1945

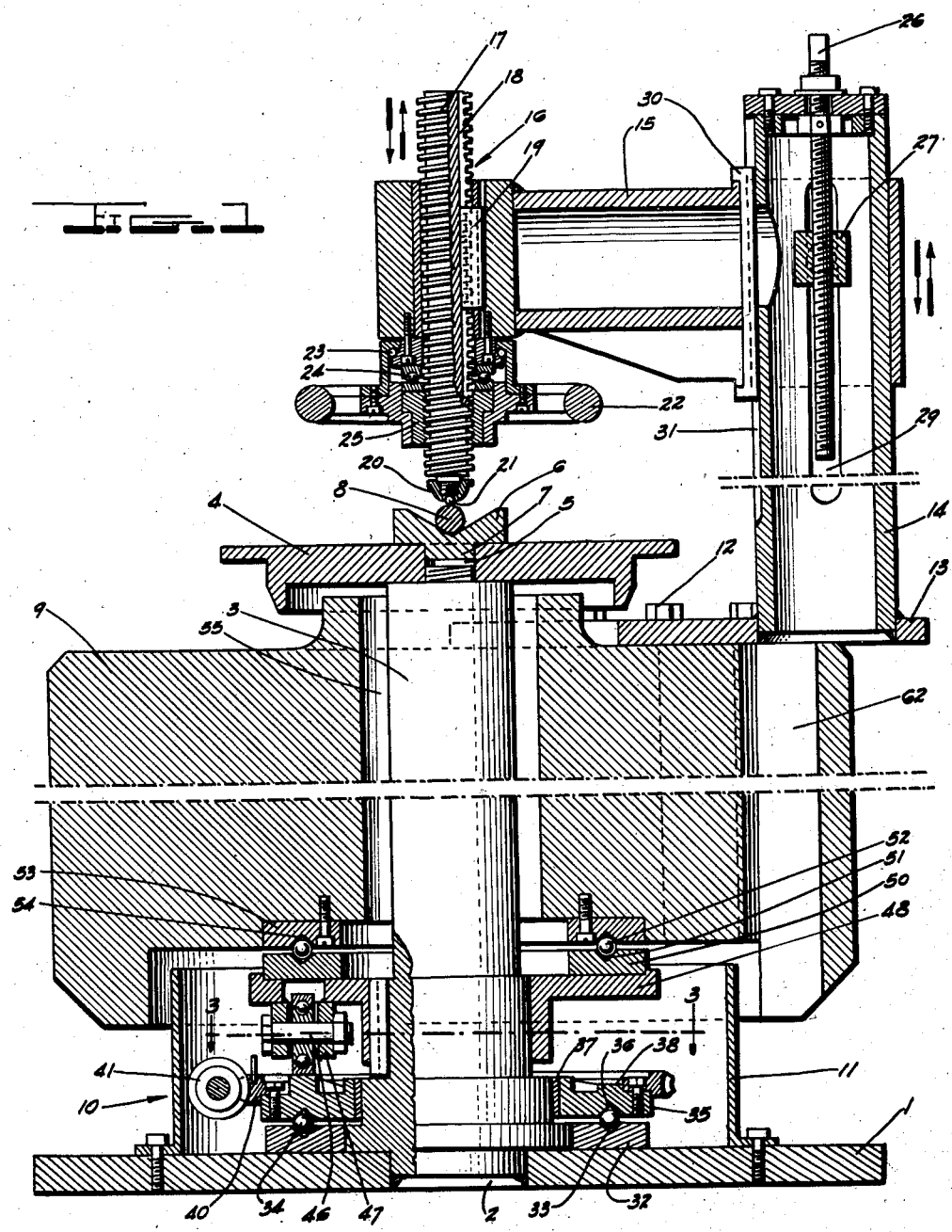

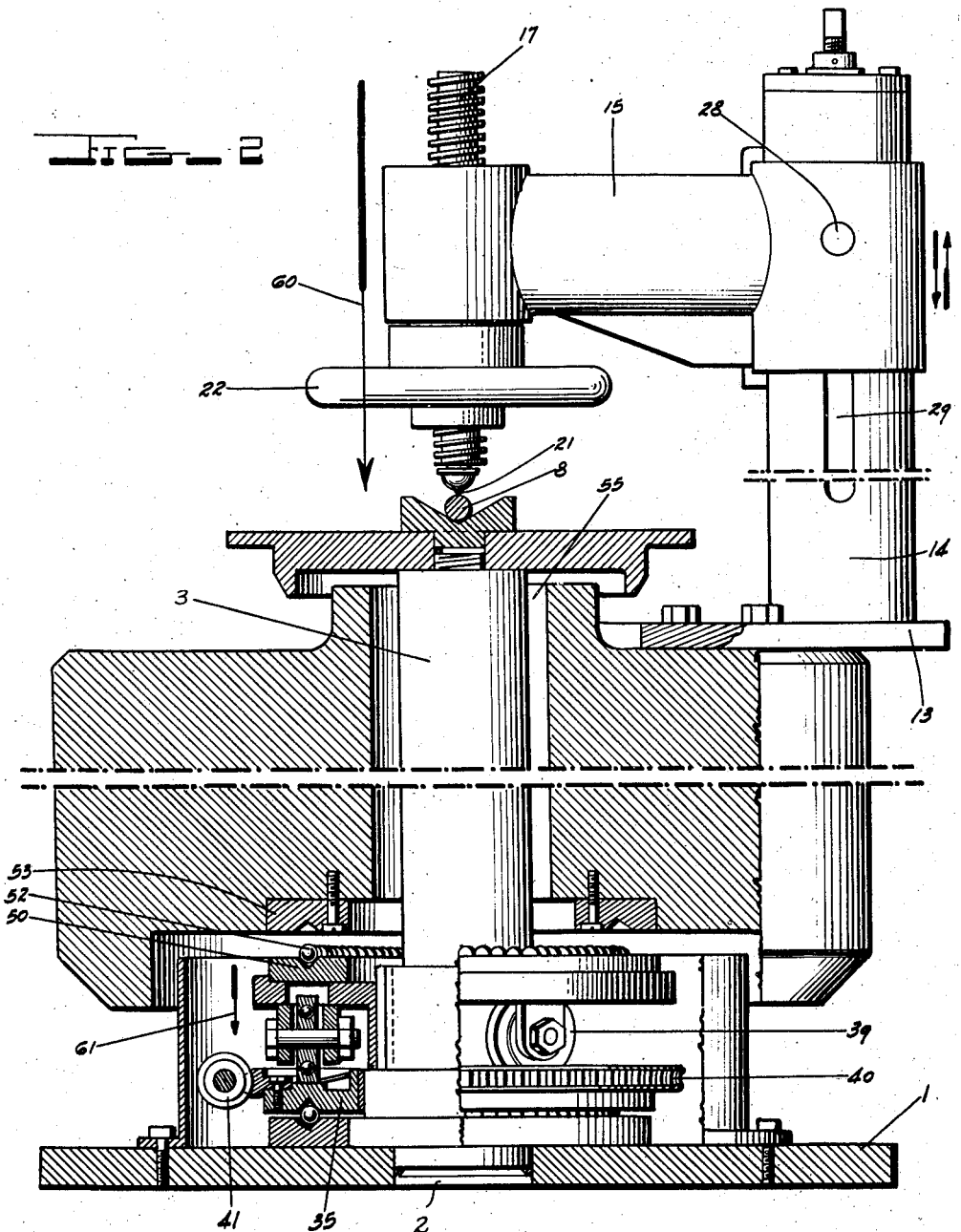

2,375,341

UNITED STATES PATENT OFFICE 2,375,341

BRINELL HARDNESS TESTING DEVICE

James O. Bishop, Torrance, and Lloyd L. Babcock, Compton, Calif., assignors to The National Supply Company, Pittsburgh, Pa., a corporation of Pennsylvania Application November 24, 1942, Serial No. 466,782

6 Claims. (Cl. 73—81)

This invention relates to a device for determining the hardness of materials and is specifically directed to an improved machine for making the Brinell hardness test.

It is the principal object of this invention to provide a device for pressing a Brinell ball into the surface of a test-piece wherein the sole actuating means for the Brinell ball consists of a gravity actuated weight.

Another object of this invention is to provide an actuating device for pressing a Brinell ball into the surface of a test-piece under an accurately known load.

Other objects and advantages will appear hereinafter.

Figure 1 is a sectional elevation of a preferred embodiment of my invention. Figure 2 is similar to Figure 1 but showing the parts in operative loaded position. Figure 3 is a plan view partly in section showing details of the lifting device for the weight member and the electrical control for the apparatus. Figure 4 is a plan view showing a detail of the cam track. Figure 5 is a side elevation of the cam track shown in Figure 4.

Referring to the drawings, a base plate 1 has a central aperture 2 for the reception of the lower end of a stationary column or post 3. The upper end of the post 3 carries a circular plate 4 provided with a central opening 5. A V block 6 has a projecting boss 7 on its lower side which fits loosely within the opening 5. A test-piece 8 is adapted to rest upon the V block 6, or upon the plate 4 in the absence of the V block 6.

A large annular weight 9 encircles a portion of the post 3 and is supported on a lifting mechanism generally identified as 10. This mechanism is mounted below the annular weight 9 and enclosed within a rim 11 secured to the base plate 1. Secured rigidly to the upper surface of the annular weight 9 as by means of bolts 12 is a plate 13 which has a welded connection to a rigid column 14. Slidably mounted on this column is a horizontally projecting arm 15 which carries an adjusting mechanism generally designated 16. The mechanism 16 includes a threaded member 17 provided with a longitudinally extending keyway 18. A key 19 carried by the arm 15 engages within the keyway 18 to permit the member 17 to have vertical rectilinear motion relative to the arm 15. Threaded to the lower end of the member 17 is a cap element 20 carrying a standard Brinell ball 21. A handwheel 22 is rotatably mounted relative to the arm 15 by means of radial bearings 23 and thrust bearings 24. Secured within the handwheel 22 is a threaded collar 25 adapted to receive the threads on member 17. When the handwheel 22 is turned the member 17 is caused to travel vertically relative to the arm 15. If desired, a further adjustable device may be provided for mounting the arm 15 relative to the column 14 and, as shown, may take the form of a screw 26 operating within a nut 27. The nut 27 carries lateral trunnions 28 which are carried by the arm 15 and operate in longitudinal slots 29 formed in the column 14. A key 30 may be provided to operate in a keyway 31 formed on the external surface of the column 14.

The annular weight 9, column 14, arm 15 and adjustable mechanism 16 form a weight member which is adapted to operate as a single unit. The column 14 and arm 15 and the connection between the plate 13 and the column 14 are made sufficiently rigid to provide adequate stiffness and substantially prevent distortion when the weight member is allowed to rest solely on the Brinell ball 21.

The lifting mechanism 10 includes a lower race plate 32 having a raceway 33 in which a series of balls 34 operate. A cam ring 35 having a similar raceway 36 is supported on the balls 34 and is provided with a bushing 37 for reception of the post 3. On the cam ring 35 is provided an annular cam track 38 on which three equally spaced rollers 39 are adapted to operate. A worm wheel 40 is secured to the plate 35 and is adapted to be driven by a worm gear 41. The gear 41 is driven by an electric motor 42 operating through reduction gearing 43. The cam track 38 is provided with three equally spaced raised portions 44 alternating with three equally spaced depressed portions 45 so that when the cam track revolves the rollers 39 are moved vertically. The rollers 39 are preferably formed of commercial anti-friction bearings complete with inner and outer races and ball elements as shown. In any case the rollers are each mounted on individual shafts 46 carried on spaced depending fingers 47 secured on a spider 48. The spider 48 is adapted for free vertical sliding movement relative to the post 3 and is keyed as shown at 49 to prevent rotation relative to the post 3. Mounted on the spider 48 is a race plate 50 provided with a raceway 51 in which a series of balls 52 operate. An upper race plate 53 has a companion raceway 54 also adapted to cooperate with the series of balls 52. It will be understood from this description that when the rollers 39 ride on the high portions 44 of the cam track 38 that the spider 48 supports the annular weight 9 by means of the balls 52.

In operation, a test specimen 8 is placed in the V block 6, or upon the plate 4 in the absence of V block 6, and the operator (not shown) turns the handwheel 22 to bring the Brinell ball 21 into contact with the test piece 8. The operator then starts the motor 42 which turns the cam ring 35 and causes the rollers 39 to ride from the high portions 44 on the cam to the low portions 45. This action causes the race plate 50 and the balls 52 to drop away from the upper race plate 53 as shown in Figure 2. In the position as shown in Figure 2 the entire weight of the annular weight 9 and its associated parts 14, 15 and 16 is supported solely on the Brinell ball 21, as indicated by arrows 60 and 61. There is no contact between the annular weight 9 and the post 3 since it will be apparent that clearance is provided between the post 3 and the bore 55 in the member 9. This suspended assembly, that is, the assembly consisting of the annular weight 9, column 14, arm 15 and adjusting device 16 rests only on the ball 21 and has not other physical contact with any other part of the machine. In practice this suspended assembly is made to weigh exactly 3000 kilograms which is the standard weight commercially used in connection with the standard Brinell ball of one centimeter diameter. One or more bored holes 62 are preferably provided in the annular weight 9 in order to counterbalance the off-center load of the column 14 and arm 15. The amount of material removed by means of such holes 62 is made to equalize the unsymmetrical load imposed by the column 14 and arm 15, and the result is that when the entire weight of the suspended assembly is allowed to rest on the Brinell ball 21 that no swinging movement of the weight occurs. In other words, the weight of material removed by the holes 62 serves to establish the center of gravity of the suspended assembly on a vertical line passing through the center of the Brinell ball 21.

A control switch 56 is provided for starting the motor 42. An auxiliary switch 57 is provided and is arranged to be actuated by means of any one of three pins 58 mounted on the worm wheel 40. When the switch 56 is initially actuated the motor 42 turns the worm wheel 40 through an angle sufficient to cause the rollers 39 to ride from the high parts 44 of the cam track 38 through the low parts 45 and back again to the high parts 44, and when the latter position is reached as shown in Figure 3 one of pins 58 strikes the actuating arm 59 controlling the auxiliary switch 57 thereby interrupting flow of current to the motor 42. The speed of rotation of the worm wheel 40 is such that the rollers 39 travel on the low parts 45 of the cam track 38 for a sufficient time to allow the Brinell ball 21 to sink into the test specimen 8 to the point where no further movement takes place. This insures that the Brinell ball 21 has been in contact with the test specimen 8 for an adequate length of time. When the rollers 39 again ride up on to the high parts 44 of the cam track 38 the pressure between the Brinell ball 21 and the test piece 8 is relieved. The motor 42 automatically stops at this point as has been described above. The operator then turns the handwheel 22 to permit removal of the test-piece 8. As is well known in the art, the Brinell hardness number is then obtained by measuring the diameter of the indentation made by the Brinell ball 21.

Having fully described our invention we claim:

1. In a device of the class described the combination of a stationary member adapted to support a test-piece, a weight member provided with a contact element, said weight member encircling the stationary supporting member, means for raising and lowering the weight member as a unit relative to the stationary member, said means acting to permit the contact element to rest on the test-piece and act as the sole support for the entire mass of the weight member.

2. In a device of the class described, the combination of a stationary vertical post adapted to support a test-piece, an annular weight encircling a portion of the stationary post, a contact element secured relative to said annular weight in co-axial position, means for lowering the annular weight to bring the contact element and test piece into engagement, whereupon the annular weight is freely suspended upon the contact element.

3. In a Brinell hardness testing device, the combination of a stationary vertical post adapted to support a test-piece, an actuating member including an annular weight encircling a portion of the stationary post but having clearance therewith, an element mounted on said member and provided with a Brinell ball, said element being adjustable relative to said annular weight in order to bring the Brinell ball into contact with the test-piece, lifting means adapted to move the actuating member in a direction axially of the stationary post, said lifting means being movable to an inoperative position to permit the Brinell ball to support the entire mass of the actuating member upon the test-piece.

4. In a Brinell hardness testing device, the combinatiton of a stationary vertical post adapted to support a test-piece, an annular weight encircling a portion of the stationary post, retractable supporting means for the annular weight, a Brinell ball secured relative to said annular weight in co-axial position, means for adjusting the vertical position of the Brinell ball relative to the annular weight to bring the Brinell ball into pressure contact with the test-piece, and means for retracting the weight supporting means when said ball is in pressure contact with the test specimen, whereby the annular weight may be freely suspended solely upon the Brinell ball.

5. In a Brinell hardness testing device, the combination of a stationary member adapted to support a test-piece, a weight member, a Brinell ball on the weight member and adapted to contact the test-piece, lifting and lowering means for the weight member including a circular cam track encircling the stationary member, roller elements operatively interposed between said cam track and said weight member for normally supporting said weight member in inoperative position and means for causing rotation of the cam track whereby the weight member may be raised or lowered, said rotation in one direction being adapted to lower the weight member and permit the entire mass of the weight member being suspended solely on the Brinell ball.

6. In a device for determining the hardness of a test specimen, a contact element, means to support the test specimen including a column positioned in substantial vertical alignment with said contact element, means for pressing the contact element partially into the surface of the test specimen, a weight member surrounding said supporting column, means operatively connecting the weight member and the contact element, means for raising and lowering said weight member as a unit relative to the supporting column, said weight member and the means operatively connecting the weight member and the contact element acting under the influence of gravity comprising the sole actuating force for the contact element.

LLOYD L. BABCOCK.
JAMES O. BISHOP.